No. 722,887. PATENTED MAR. 17, 1903.
E. PEARSON.
MEANS FOR SECURING DOOR KNOBS, &c.
APPLICATION FILED SEPT. 22, 1902.
NO MODEL.
Fig:1.
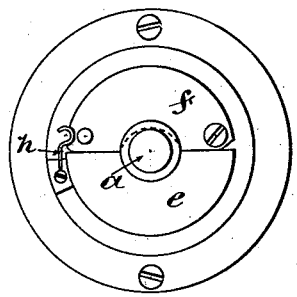
Fig:2.
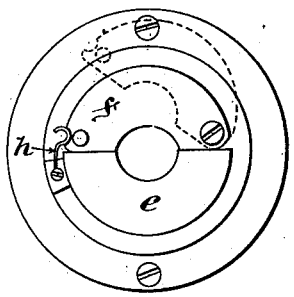
Fig:3.
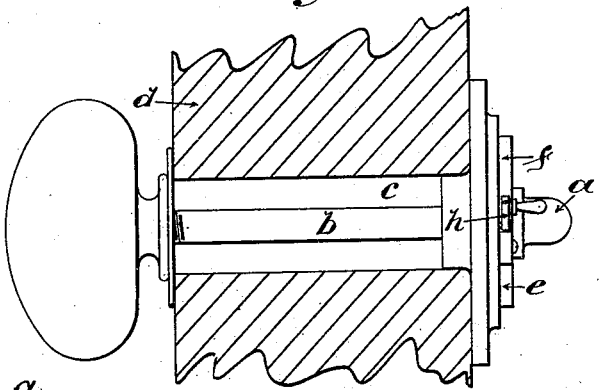
Fig:5.
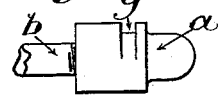
Fig:4.
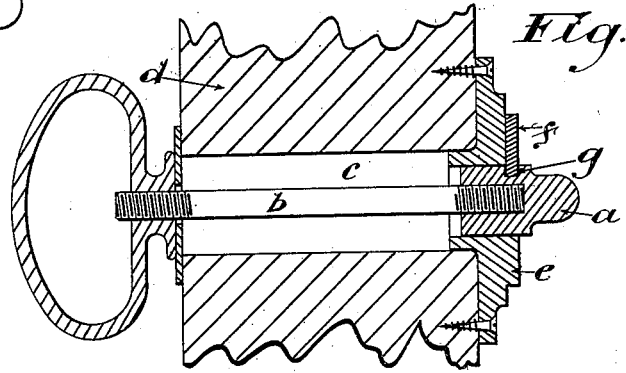
Witnesses:—
Alice E. George
Charles H. Briggs
Inventor:—
Edwin Pearson.
per:— Z. Eaton.
His Attorney.
THE NORRIS PETERS CO., PHOTO-LITHO., WASHINGTON, D. C.

UNITED STATES PATENT OFFICE.

EDWIN PEARSON, OF RICHMOND, ENGLAND.

MEANS FOR SECURING DOOR-KNOBS, &c.

SPECIFICATION forming part of Letters Patent No. 722,887, dated March 17, 1903.

Application filed September 22, 1902. Serial No. 124,492. (No model.)

*To all whom it may concern:*

Be it known that I, EDWIN PEARSON, a subject of the King of Great Britain, and a resident of Richmond, in the county of Surrey, England, have invented certain new and useful Improvements in Fixing Knockers, Handles, and other Door-Furniture, (for which I have applied for a patent in Great Britain, No. 10,496, dated May 7, 1902,) of which the following is a full, clear, and exact specification thereof.

This invention relates to a new or improved means of securing or holding in position door-knobs, knockers, and such like articles, the object being to facilitate their adjustment and removal.

Referring to the annexed drawings, Figure 1 is an end elevation of my invention. Fig. 2 is an end elevation of same, showing the spindle or bolt and nut removed; Fig. 3, a side elevation of my invention in position on a door; Fig. 4, a sectional side elevation of my invention in position on a door; Fig 5, a side elevation of nut.

The nut $a$ is screwed onto the end of the handle spindle or bolt $b$ and is then passed through the hole or aperture $c$ in the door $d$, the nut protruding from the rose or plate $e$, which carries the pivoted section or plate $f$. The nut $a$ is constructed with the recess $g$, into which the pivoted section or plate $f$ engages, thus holding the same rigidly in position, $h$ being a spring for holding the pivoted section $f$ in its closed position.

Having thus described my invention, what I claim, and desire to secure by Letters Patent, is—

In means for securing door-knobs, knockers and such like articles, a spindle having the door-knob, knocker or the like article attached to one end thereof, a nut screwed onto the other end of said spindle and having a transverse recess therein, a rose-plate attached to back of the door having a central hole therein through which said nut is free to pass, a section or plate pivotally attached to said rose-plate and adapted to engage with the recess aforesaid, a spring maintaining said section or plate in position, all in combination, substantially as described and illustrated herein.

In testimony that I claim the foregoing I have hereunto set my hand this 11th day of July, 1902.

EDWIN PEARSON.

Witnesses:
 RICHARD BUNDY,
 CHARLES H. BRIGGS.